United States Patent
Chen et al.

(10) Patent No.: US 11,716,714 B2
(45) Date of Patent: *Aug. 1, 2023

(54) ENHANCED TONE MAPPING FOR TRIGGER-BASED NULL DATA PACKET FEEDBACK

(71) Applicant: Intel Corporation, Santa Clara, CA (US)

(72) Inventors: Xiaogang Chen, Portland, OR (US); Shlomi Vituri, Tel Aviv (IL); Assaf Gurevitz, Ramat Hasharon (IL); Qinghua Li, San Ramon, CA (US); Feng Jiang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,533

(22) Filed: Dec. 30, 2021

(65) Prior Publication Data
US 2022/0124718 A1   Apr. 21, 2022

Related U.S. Application Data

(63) Continuation of application No. 16/882,824, filed on May 26, 2020, now Pat. No. 11,324,002, which is a
(Continued)

(51) Int. Cl.
*H04L 25/02* (2006.01)
*H04L 5/00* (2006.01)
(Continued)

(52) U.S. Cl.
CPC .......... *H04W 72/0453* (2013.01); *H04L 5/00* (2013.01); *H04L 5/005* (2013.01); *H04L 5/0053* (2013.01)

(58) Field of Classification Search
CPC ...... H04W 72/0453; H04L 5/00; H04L 5/005; H04L 5/0053; H04L 27/2613; H04L 5/0092
See application file for complete search history.

(56) References Cited

U.S. PATENT DOCUMENTS 10,313,976 B2 *  6/2019  Moon .................... H04L 5/0023
10,819,478 B2 * 10/2020  Zhu ...................... H04L 27/2602
(Continued)

FOREIGN PATENT DOCUMENTS

AU        2015304131 B2 *  8/2018  ........... H04L 1/0006
WO    WO-2018140187 A1 *  8/2018  ............... H04L 1/00

*Primary Examiner* — Ahmed Elallam
(74) *Attorney, Agent, or Firm* — Eversheds Sutherland (US) LLP

(57) ABSTRACT

This disclosure describes systems, methods, and devices related to tone mapping for a high-efficiency (HE) trigger-based (TB) null data packet (NDP) feedback physical layer protocol data unit (PPDU). A device may identify a frame received from a second device. The device may determine, based on the frame, a resource unit allocated to the device, wherein the resource unit is associated with a 20 MHz sub-channel of a bandwidth. The device may determine, based on the resource unit and the bandwidth, tones associated with a HE short training field (HE-STF) of a HE TB NDP feedback PPDU. The device may send the HE TB NDP feedback PPDU to the second device in the 20 MHz sub-channel, wherein the HE TB NDP feedback PPDU includes the tones.

20 Claims, 8 Drawing Sheets

Related U.S. Application Data continuation of application No. 16/251,010, filed on Jan. 17, 2019, now Pat. No. 10,667,265.

(60) Provisional application No. 62/618,410, filed on Jan. 17, 2018.

(51) Int. Cl.
*H04L 25/03* (2006.01)
*H04W 72/0453* (2023.01)

(56) References Cited

U.S. PATENT DOCUMENTS

| | | | |
|---|---|---|---|
| 10,826,588 B2* | 11/2020 | Chun | H04L 25/0224 |
| 10,911,193 B2* | 2/2021 | Park | H04B 7/0452 |
| 10,917,217 B2* | 2/2021 | Park | H04L 5/0053 |
| 10,979,267 B2* | 4/2021 | Lim | H04L 27/26025 |
| 11,324,002 B2* | 5/2022 | Chen | H04L 5/00 |
| 2017/0359159 A1* | 12/2017 | Kim | H04L 1/1685 |

* cited by examiner

ENHANCED TONE MAPPING FOR TRIGGER-BASED NULL DATA PACKET FEEDBACK

CROSS-REFERENCE TO RELATED APPLICATIONS

This is a continuation of U.S. application Ser. No. 16/882,824, filed May 26, 2020, which is a continuation of U.S. application Ser. No. 16/251,010, filed Jan. 17, 2019, issued as U.S. Pat. No. 10,667,265, on May 26, 2020, which claims the benefit of U.S. Provisional Application No. 62/618,410, filed Jan. 17, 2018, the disclosures of which are incorporated herein by reference in their entireties.

TECHNICAL FIELD

This disclosure generally relates to systems and methods for wireless communications and, more particularly, to trigger-based null data packet (NDP) feedback.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
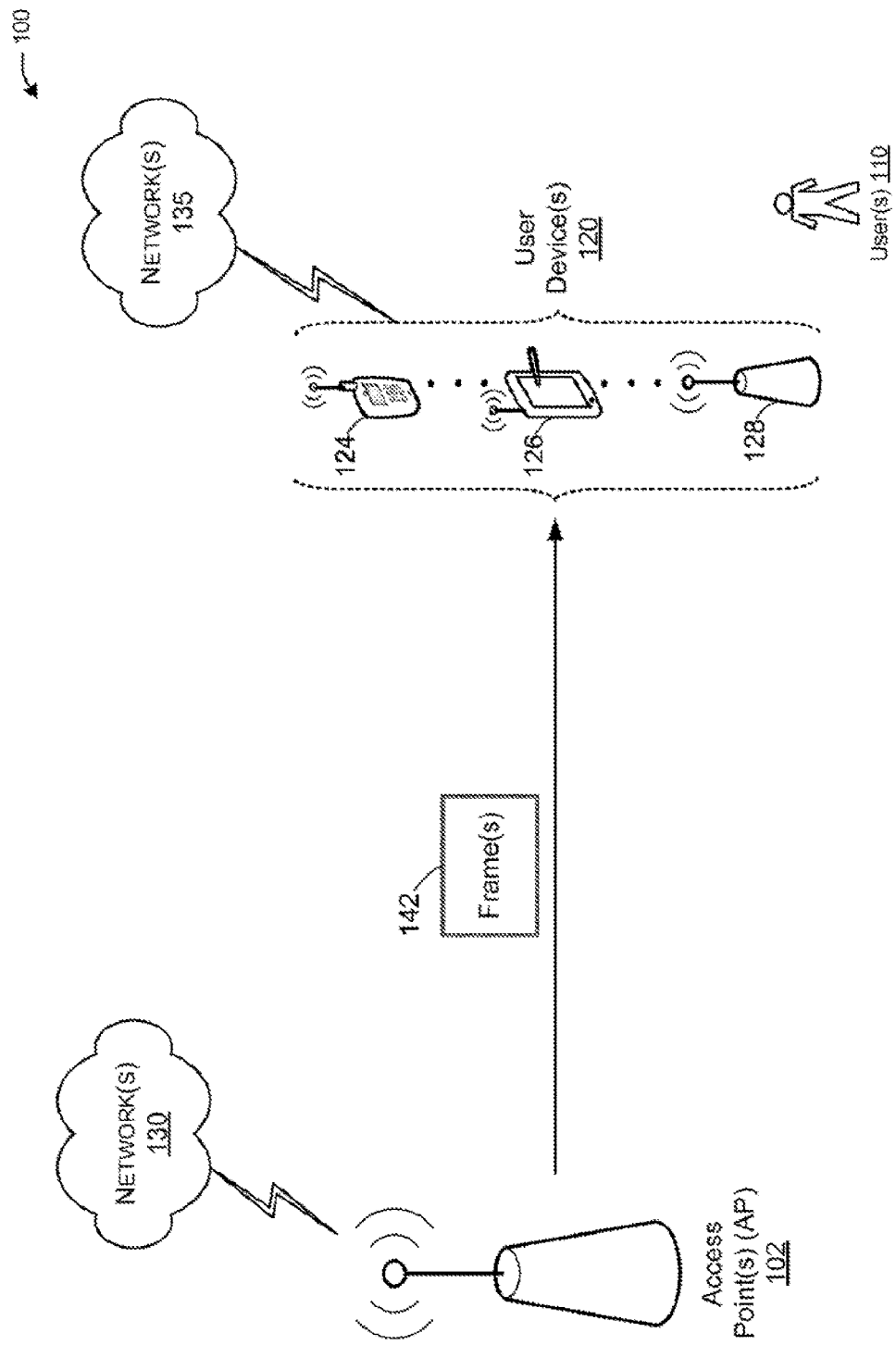
FIG. 1 is a network diagram illustrating an example network environment, in accordance with one or more example embodiments of the present disclosure.

Example embodiments described herein provide certain systems, methods, and devices for HE-STF tone mapping and sequence design for trigger-based NDP feedback. The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

A subcarrier (also referred to herein as tone) may refer to signal sounds in a frequency domain. Orthogonal Frequency-Division Multiplexing (OFDM) represents a multi-carrier modulation scheme that allows for modulation of multiple subcarrier signals on multiple streams or channels. A resource unit (RU) may include a group of subcarriers as an allocation unit, and multiple user devices may be allocated an RU within a channel bandwidth. The location of tones within a RU may depend on the bandwidth of a channel and the number of RUs/sub-channels in the channel bandwidth.

There may be several types of subcarriers. One subcarrier type may be a data subcarrier (e.g., data tone), which may be used for data transmission. Data subcarriers may be frequency channel dependent. One subcarrier type may be a pilot subcarrier (e.g., pilot tone), which may be used for channel estimation and parameter tracking, such as carrier frequency offset and sampling frequency offset calculations. These calculations may be useful in making corrections at a device receiving the signal. One subcarrier type may be an unused subcarrier that is not used for either data or pilot transmission. Unused subcarriers may include a direct current (DC) subcarrier (e.g., a DC=0 value), a Guard band subcarrier at band edges, and Null subcarriers. Null subcarriers may be located near a DC or edge tone to protect those tones near the DC or edge tones from interference of a neighboring resource unit (RU). Null subcarriers may have zero energy.

Respective subcarriers may be spaced by a constant step value, and therefore may have indexes referring to their location on a frequency spectrum. The frequency of a pilot tone may be used for determining a phase that may be used in demodulation of a signal, for example. Channel estimation using pilot subcarriers may allow for increased capacity of OFDM systems.

An RU, having a number of tones (e.g., signal sounds), may consist of a number of data and pilot subcarriers. For example, a 26-tone RU may consist of 24 data subcarriers and two pilot subcarriers. A 52-tone RU may consist of 48 data subcarriers and 4 pilot subcarriers. Other sizes of RUs may have different numbers of data and pilot subcarriers as defined by the IEEE 802.11 family of standards. The pilot subcarrier positions of the RU may be fixed (e.g., as set in the IEEE 802.11ad standard), or may vary as described herein (e.g., may be frequency channel dependent).

The location signal tones for OFDM may be defined by a grid or structure in a frequency domain. In particular, pilot subcarriers (e.g., tones) may be set in fixed locations for a given frequency channel. The locations of subcarriers defined by a tone grid or tone map may depend on a bandwidth. Larger bandwidths may allow for more tones, so tone maps for larger bandwidths may account for the larger number of tones than tone maps for smaller bandwidths. For example, a 20 MHz bandwidth may allow for 256 tones, a 40 MHz bandwidth may allow for 512 tones, an 80 MHz bandwidth may allow for 1024 tones, and a 160 MHz bandwidth and an 80 MHz+80 MHz bandwidth (e.g., two non-contiguous 80 MHz channels) may allow for 2048 subcarriers. A tone map for an RU in a 20 MHz bandwidth may not be used in a larger bandwidth, for example, because a tone map in a 20 MHz bandwidth may not account for the increased number of tones in a larger bandwidth. For example, a 20 MHz RU tone allocation may include certain numbers of data tones, pilot tones, null tones, DC tones, and guard tones. When applied to a 40 MHz frequency, the 20 MHz RU tone allocation would not cover the entire bandwidth, and the tone allocations would not match the locations of the larger bandwidth, such as the edge locations and the mid-bandwidth locations used for DC tones. Therefore, any bandwidth may have one or more tone maps to indicate the locations of different types of tones given the different number of RUs allocated and given the number of tones allowed in the bandwidth.

In the IEEE 802.11ax technical standard, an uplink (UL) orthogonal frequency-division multiple access (OFDMA) transmission may use a high-efficiency (HE) trigger-based (TB) null data packet (NDP) feedback physical layer protocol data unit (PPDU) to carry NDP feedback report information as part of an NDP feedback report procedure. The NDP feedback report may allow an access point (AP) to collect feedback from multiple station devices (STAs). The feedback may not be for channel sounding, for example. An AP may send a trigger frame to solicit a NDP feedback report response from multiple STAs identified by access identifiers (AIDs) included in the trigger frame. Responding STAs may use a HE TB NDP feedback PPDU to carry the feedback report. The HE TB NDP feedback PPDU may include a HE short training field (HE-STF) and a HE long training field (HE-LTF) field, and other fields preceding the HE-STF, which may be referred to as pre-HE modulated fields. The HE-LTF may include two symbols which may be mapped to a tone map by populating energy on a number of tones (e.g., six tones) of the HE-LTF when distributed across a 20 MHz channel/sub-channel, for example.

A HE TB NDP feedback PPDU may include a legacy short training field (L-STF) with a duration of eight microseconds, a legacy long training field (L-LTF) with a duration of eight microseconds, a legacy signal field (L-SIG) with a duration of four microseconds, a repeated legacy signal field (RL-SIG) with a duration of four microseconds, a HE signal-A field (HE-SIG-A) with a duration of eight microseconds, a HE-STF with a duration of eight microseconds, and a HE-LTF with two HE-LTF symbols each having a duration of sixteen microseconds using a 4× HE-LTF mode. The HE TB NDP feedback PPDU format may not include a data field, and the packet extension may be zero. The number of symbols to allocate for a field depends on the duration of the field in the particular type of frame, the duration of the frame, and/or the purpose of the frame, for example. Thus, one field in one type of frame may not be able to use the same tone allocation as another field in a different type of frame.

Currently, the HE TB NDP feedback PPDU does not have a RU-based tone map for the information carried by the HE-STF in the HE TB NDP feedback PPDU because the HE TB NDP feedback PPDU uses a NDP. The pre-HE modulated fields may be sent on the 20 MHz sub-channel on which the HE-modulated fields (e.g., HE-STF, HE-LTF) are located, but the tone mapping of the HE-STF in the HE TB NDP feedback PPDU is not defined. For example, the HE-STF may use tone locations which overlap the HE-LTF tone locations in a sub-channel or may use tones spanning the entire 20 MHz sub-channel. Tone mappings for the HE-STF of a HE TB NDP feedback PPDU may need to be defined.

Example embodiments of the present disclosure relate to systems, methods, and devices for tone mapping for trigger-based NDP feedback.

In one embodiment, for a non-AP STA having 80 MHz operation capability, the HE-STF of the HE TB NDP feedback PPDU may use a tone map/grid and 80 MHz sequences. The HE-STF for an STA may be populated on the tones that intersect with one physical 20 MHz sub-channel in an 80 MHz bandwidth. The 20 MHz sub-channel may be used for the HE-LTF tone allocation. For example, in an 80 MHz bandwidth with four 20 MHz sub-channels, if an STA uses the first 20 MHz sub-channel for the HE-LTF tones, then the tones for the HE-STF also may be allocated in the first 20 MHz sub-channel. If an STA uses the second 20 MHz sub-channel for the HE-LTF tones, then the tones for the HE-STF also may be allocated in the second 20 MHz sub-channel.

In one embodiment, for a 20 MHz transmission, a frequency domain sequence for the HE TB PPDUs may be represented by the following equations: $HES_{-120:8:120}=\{M, 0, -M\} (1+j/2)$. $HES_{a:b:c}$ refers to coefficients of the HE-STF on every b tone indices from a to c tone indices, and coefficients on other tone indices may be set to zero. The frequency domain sequence for the HE TB NDP feedback PPDU may be provided by: $HES^{TB\ NDP}_{-120:8:120}=HES_{-120:8:120}$. The $HES^{TB\ NDP}_{-120:8:120}$ refers to the HE-STF for the HE TB NDP feedback PPDU. In the equation for the $HES_{-120:8:120}$, M is a sequence for the HE-STF, j is a unit imaginary number, and $_{-120:8:120}$ refers to the index values for tones (e.g., tone indexes) beginning at −120 and continuing every 8 values until 120 (e.g., 31 tone indexes). The tone indexes may correspond to the location of where tones are allocated within the 20 MHz bandwidth. For example, starting at the center of the 20 MHz bandwidth, every 8 values in both directions from the center may have a tone allocated. The result may be tones at values −120 and +120. With 31 tone indexes in a 20 MHz bandwidth, a tone may be allocated every 0.645 MHz (e.g., 20 MHz/31 tone indexes=0.645 MHz per tone index). If the center of a 20 MHz channel is at 0 MHz, for example, every 0.645 MHz in each direction there may be an allocated tone. The center of a channel or sub-channel does not have to be zero.

In one embodiment, for a 40 MHz transmission, a frequency domain sequence for the HE TB PPDUs may be represented by the following equations: $HES_{-248:8:248}=\{M, -1, -M, 0, M-1, M\} (1+j/2)$, and $HES_{\pm 248}=0$. $HES_{a:b:c}$ refers to coefficients of the HE-STF on every b tone indices from a to c tone indices, and coefficients on other tone indices are set to zero. The frequency domain sequence for the HE TB NDP feedback PPDU may be provided by: $HES^{TB\ NDP}_{-248:8:-8}=\{M, -1, -M\} (1+j/2)$ if the RU_TONE_SET_INDEX≤18, and $HES^{TB\ NDP}_{8:8:248}=\{M, -1, M\}$ $(1+j/2)$ if the RU_TONE_SET_INDEX>18. M is a sequence for the HE-STF, j is a unit imaginary number, and $_{-248:8:-8}$ and $_{8:8:248}$ refer to the index values for tones (e.g., tone indexes) beginning at −248 and continuing every 8 values until −8 (e.g., 31 tone indexes) and beginning at 8 and continuing every 8 values until 248 (e.g., 31 tone values). The gap in between −8 and +8 may be for STAs which do not operate in bandwidths larger than 20 MHz, as such devices may not be able to allocate tones beyond the 20 MHz bandwidth. The tone indexes may correspond to the location of where tones are allocated within the 40 MHz bandwidth. For example, starting at the center of a 20 MHz sub-channel, every 8 values in both directions from the center may have a tone allocated. A tone may be allocated every 0.645 MHz (e.g., 20 MHz/31 tone indexes=0.645 MHz per tone index) in a 20 MHz sub-channel.

In one embodiment, for a 80 MHz transmission, a frequency domain sequence for the HE TB PPDUs may be represented by the following equations: $HES_{-504:8:504}=\{M, -1, M-1, -M, -1, M, 0, -M, 1, M, 1, -M, 1, -M\}$ $(1+j/2)$, and $HES_{\pm 504}=0$. $HES_{a:b:c}$ refers to coefficients of the HE-STF on every b tone indices from a to c tone indices, and coefficients on other tone indices are set to zero. The frequency domain sequence for the HE TB NDP feedback PPDU may be provided by: $HES^{TB\ NDP}_{-504:8:-264}=\{M, -1, M\}$ $(1+j/2)$, if $RU\_TONE\_SET\_INDEX \geq 18$; $HES^{TB\ NDP}_{-248:8:-8}=\{-M, -1, M\}$ $(1+j/2)$, if $18<RU\_TONE\_SET\_INDEX \leq 36$; $HES^{TB\ NDP}_{8:8:248}=\{-M, 1, M\}$ $(1+j/2)$, if $36<RU\_TONE\_SET\_INDEX \leq 54$; and $HES^{TB\ NDP}_{264:8:504}=\{-M, 1, -M\}$ $(1+j/2)$, if $RU\_TONE\_SET\_INDEX>54$, where $HES^{TB\ NDP}_{+504}=0$. M is a sequence for the HE-STF, j is a unit imaginary number, and $_{-504:8:-264}$, $_{-248:8:-8}$, $_{8:8:248}$, and $_{264:8:504}$ refer to the index values for tones (e.g., tone indexes) beginning at $-504$ and continuing every 8 values until $-264$ (e.g., 31 tone indexes), beginning at $-248$ and continuing every 8 values until $-8$ (e.g., 31 tone values), beginning at 8 and continuing every 8 values until 248 (e.g., 31 tone indexes), and beginning at 264 and continuing every 8 values until 504 (e.g., 31 tone indexes). The gaps in between $-264$ and $-248$, between $-8$ and $+8$, between $+248$ and $+264$ may be for STAs which do not operate in bandwidths larger than 20 MHz, as such devices may not be able to allocate tones beyond the 20 MHz bandwidth. The tone indexes may correspond to the location of where tones are allocated within the 80 MHz bandwidth. The tone indexes may correspond to the location of where tones are allocated within the 80 MHz bandwidth. For example, starting at the center of a 20 MHz sub-channel, every 8 values in both directions from the center may have a tone allocated. A tone may be allocated every 0.645 MHz (e.g., 20 MHz/31 tone indexes=0.645 MHz per tone index) in a 20 MHz sub-channel.

In one embodiment, the RU_TONE_SET_INDEX may be provided by a trigger frame sent by an AP to one or more STAs. The trigger frame may have access identifiers (AIDs) identifying the STAs whose UL responses are intended to be triggered by the trigger frame. RU_TONE_SET_INDEX= (AID−Starting AID) mod $(18 \times 2^{BW})$, where BW refers to the bandwidth (e.g., 40 MHz, 80 MHz, 160 MHz), mod is a modulus, AID is the AID of a corresponding STA, and Starting AID is the first AID among multiple AIDs included in a sub-field of a User Information field of the trigger frame. RU_TONE_SET_INDEX≤18 may refer to the first 20 MHz sub-channel in a 40 MHz or 80 MHz bandwidth (e.g., allocated to a first STA with a first AID), RU_TONE_SET_INDEX>18 may refer to the second 20 MHz sub-channel in a 40 MHz bandwidth (e.g., allocated to a second STA with a second AID), 18<RU_TONE_SET_INDEX≤36 may refer to a second 20 MHz sub-channel in a 80 MHz bandwidth, 36<RU_TONE_SET_INDEX≤54 may refer to a third 20 MHz sub-channel in a 80 MHz bandwidth, and RU_TONE_SET_INDEX>54 may refer to a fourth 20 MHz sub-channel in a 80 MHz bandwidth.

In one embodiment, the sequence M may be defined for different bandwidths. For the HE-STF, M may be $\{-1, -1, -1, 1, 1, 1, -1, 1, 1, 1, -1, 1, 1, -1, 1\}$ or another sequence of +1s and −1s. When M has 15 values, then for a 20 MHz tone allocation when $HES_{-120:8:120}=\{M, 0, -M\}$ $(1+j/2)$ and $HES^{TB\ NDP}_{-120:8:120}=HES_{-120:8:120}$, 31 tones may be allocated for the HE-STF of an HE TB feedback PPDU by the equation for a 20 MHz tone allocation. For a 40 MHz tone allocation when $HES^{TB\ NDP}_{-248:8:-8}=\{M, -1, -M\}$ $(1+j/2)$ if the RU_TONE_SET_INDEX≤18, and $HES^{TB\ NDP}_{8:8:248}=\{M, -1, M\}$ $(1+j/2)$ if the RU_TONE_SET_INDEX>18, each of the 20 MHz sub-channels of the 40 MHz bandwidth may have 31 tones allocated. For an 80 MHz tone allocation when $HES^{TB\ NDP}_{-504:8:-264}=\{M, -1, M\}$ $(1+j/2)$, if RU_TONE_SET_INDEX≤18; $HES^{TB\ NDP}_{-248:8:-8}=\{-M, -1, M\}$ $(1+j/2)$, if 18<RU_TONE_SET_INDEX≤36; $HES^{TB\ NDP}_{8:8:248}=\{-M, 1, M\}$ $(1+j/2)$, if 36<RU_TONE_SET_INDEX≤54; and $HES^{TB\ NDP}_{264:8:504}=\{-M, 1, -M\}$ $(1+j/2)$, if RU_TONE_SET_INDEX>54, where $HES^{TB\ NDP}_{+504}=0$, each of the 20 MHz sub-channels of the 80 MHz bandwidth may have 31 tones allocated. The HE-STF may be constructed by mapping the M sequence(s) multiplied by $(1+j)/\sqrt{2}$ or $(-1-j)/\sqrt{2}$ to any 242-tone RU in a 20 MHz sub-channel. For a transmission bandwidth greater than 40 MHz, $(1+j)/\sqrt{2}$ or $(-1+j)/\sqrt{2}$ may be assigned to tone indexes that are inside a center 26-tone RU of the transmission bandwidth In one or more embodiments, the equations for allocating tones in different bandwidths as described above may relate the HE-STF tones to the location of the HE-LTF tones in a HE TB NDP feedback PPDU. In particular, the RU_TONE_SET_INDEX may be used to determine the tone indexes for the tones in the HE-LTF of the HE TB NDP feedback PPDU.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of trigger based NDP feedback, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 6:
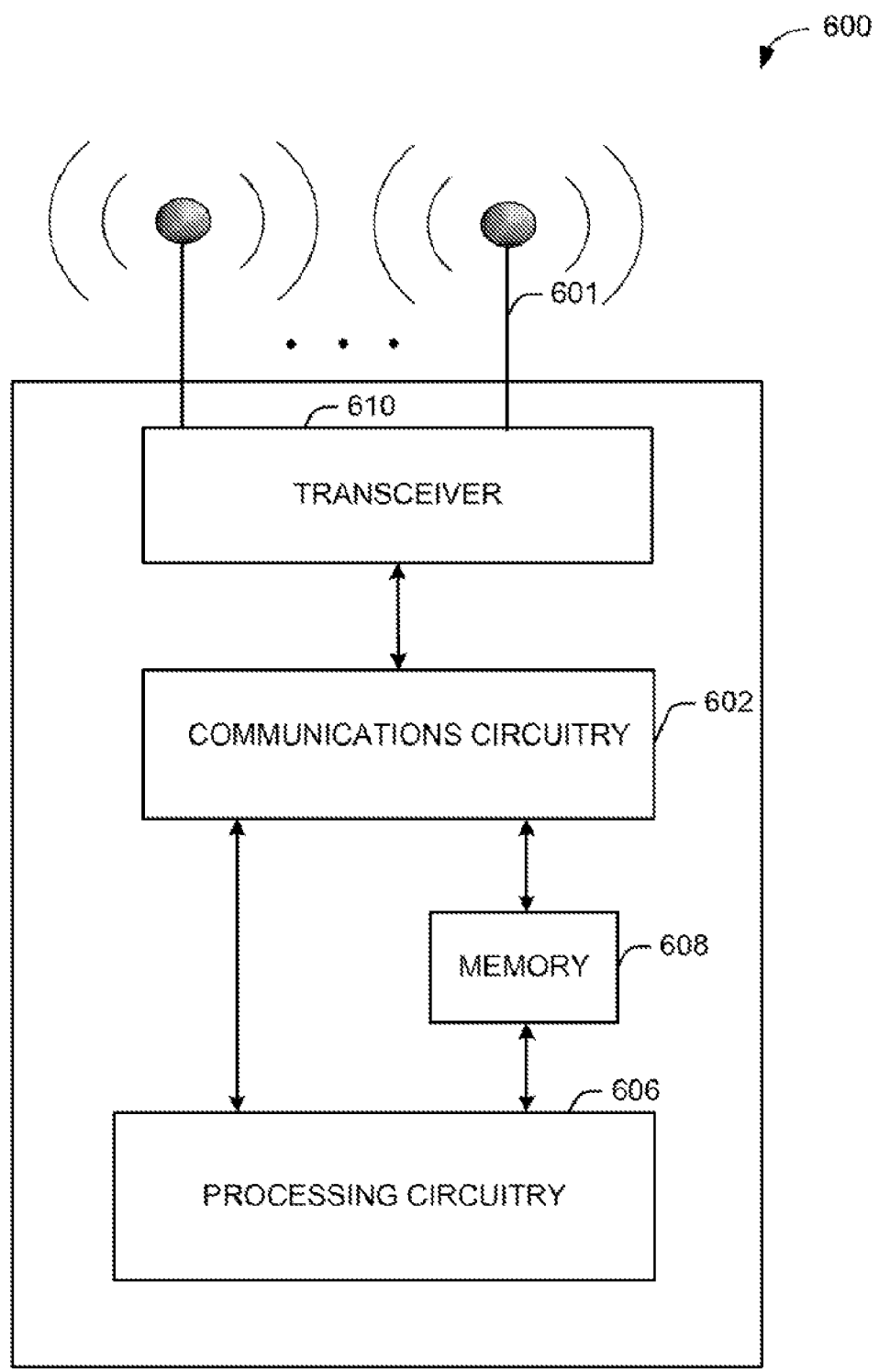
FIG. 6 illustrates a functional diagram of an exemplary communication station that may be suitable for use as a user device, in accordance with one or more example embodiments of the present disclosure.
Figure 7:
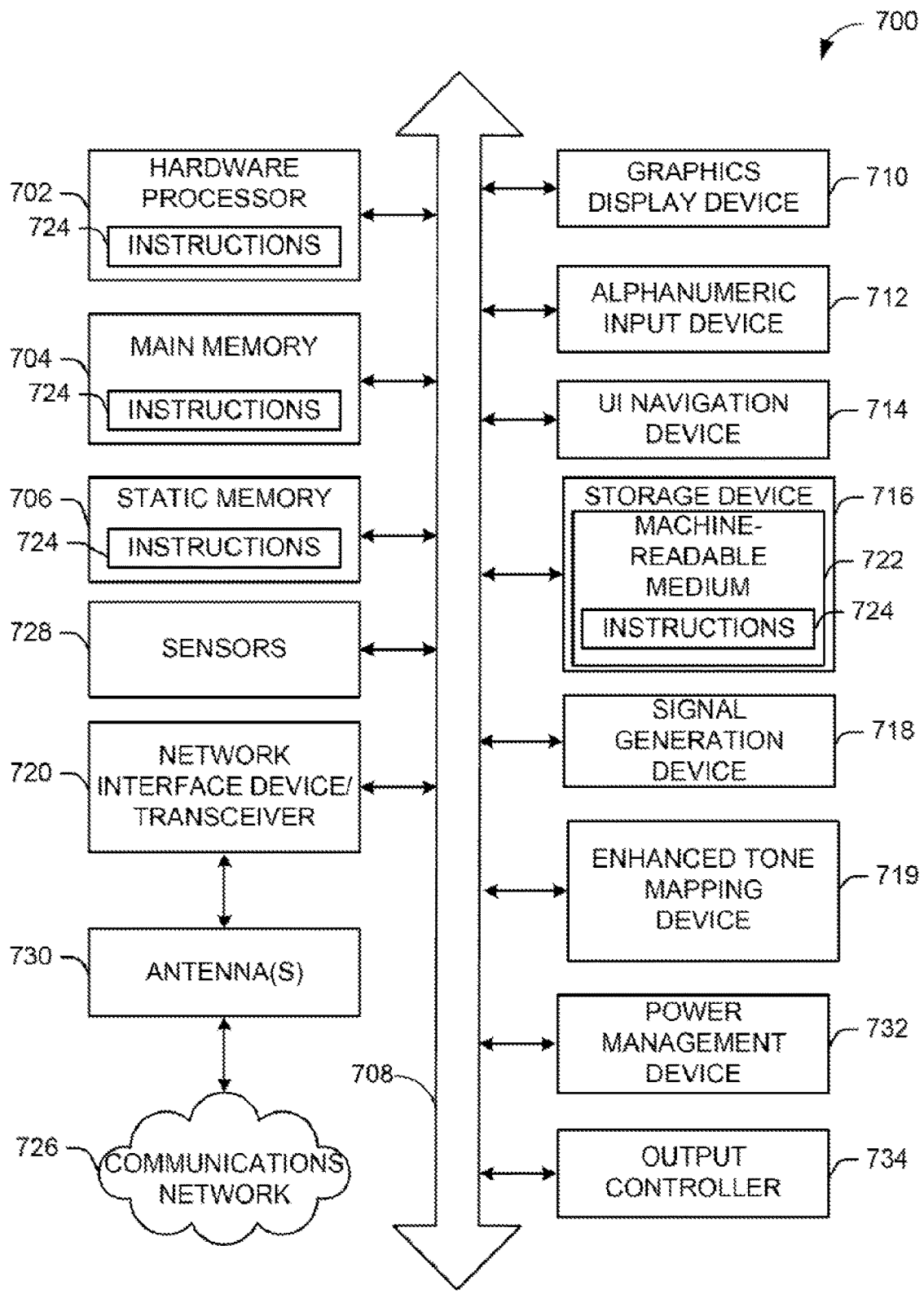
FIG. 7 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, AP 102 may communicate with one or more user devices 120. The AP 102 and the user devices 120 may exchange one or more frames 142. The one or more frames 142 may include trigger frames sent by the AP 102, uplink frames such as HE TB NDP feedback PPDUs, and other types of frames. A trigger frame may trigger an uplink transmission from the user devices 120, and may provide information which may allow the user devices 120 to determine the tones and tone locations within a bandwidth to use when transmitting uplink responses.

It is understood that the above descriptions are for purposes of illustration and are not meant to be limiting.

Figure 2:
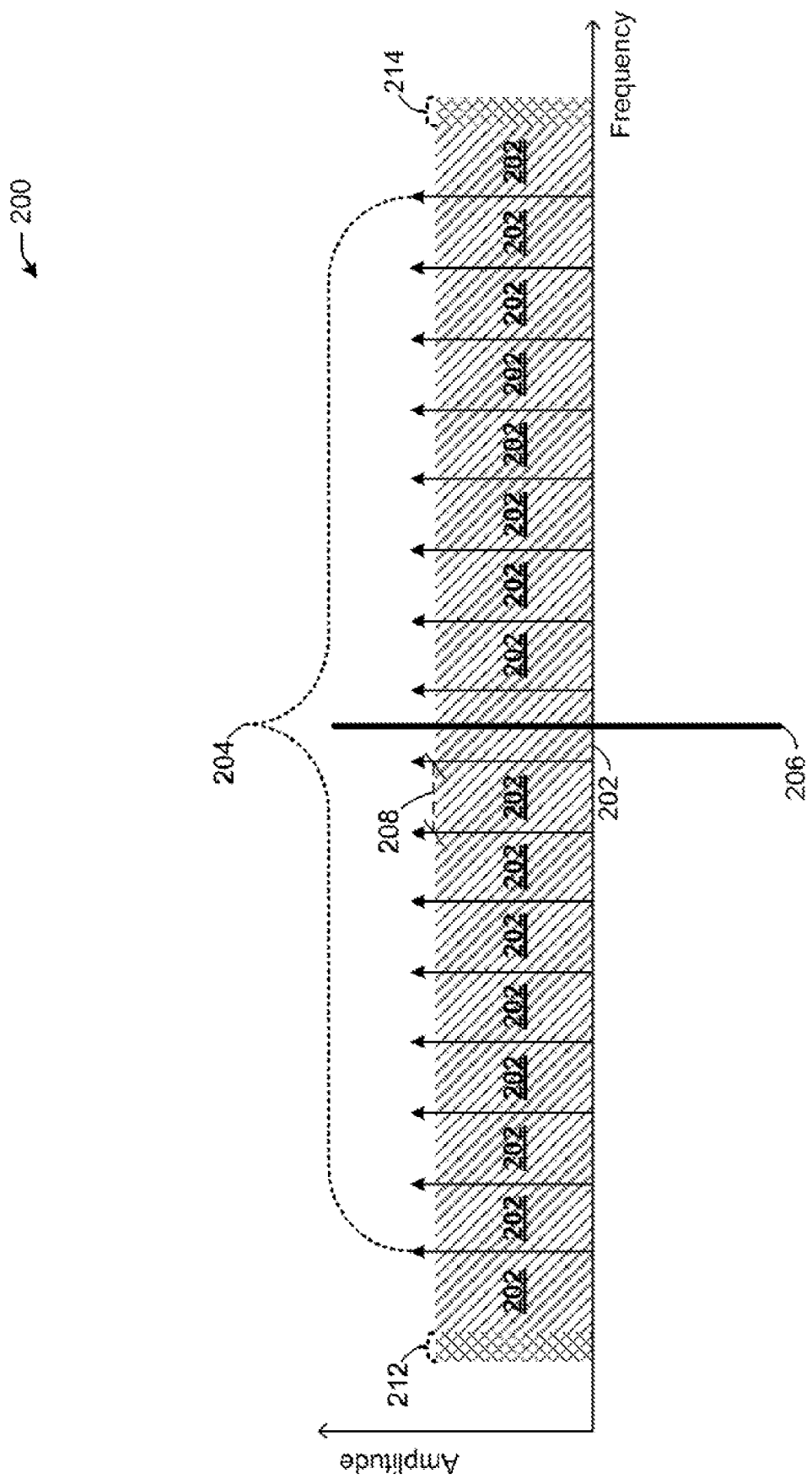
FIG. 2 depicts an illustrative schematic diagram of an orthogonal frequency-division multiplexing (OFDM) signal spectrum.

FIG. 2 depicts an illustrative schematic diagram 200 of an OFDM signal spectrum.

In one or more embodiments, an OFDM signal spectrum may be composed of data, pilot, zero DC, and zero guard band (GB) subcarriers. Data and pilot subcarriers may define the total number of occupied subcarriers (tones) in the OFDM signal spectrum. The spectrum may include GBs (e.g., GB 212 and GB 214) to account for interference with nearby or adjacent channels.

Referring to FIG. 2, data tones 202 and pilot tones 204 are shown. One or more DC subcarriers 206 may be set in the middle of the subcarriers. The location of the tones may be based on the tone allocation plan used for the bandwidth.

In one embodiment, for a 20 MHz transmission, a frequency domain sequence for the HE TB PPDUs may be represented by the following equations: $HES_{-120:8:120}=\{M, 0, -M\} (1+j/2)$. $HES_{a:b:c}$ refers to coefficients of the HE-STF on every b tone indices from a to c tone indices, and coefficients on other tone indices are set to zero. The frequency domain sequence for the HE TB NDP feedback PPDU may be provided by: $HES^{TB\ NDP}_{-120:8:120} = HES_{-120:8:120}$. The $HES^{TB\ NDP}_{-120:8:120}$ refers to the HE-STF for the HE TB NDP feedback PPDU. In the equation for the $HES_{-120:8:120}$, M is a sequence for the HE-STF, and j is a unit imaginary number, and $_{-120:8:120}$ refers to the index values for tones (e.g., tone indexes) beginning at −120 and continuing every 8 values until 120 (e.g., 31 tone indexes). The tone indexes may correspond to the location of where tones are allocated within the 20 MHz bandwidth. For example, starting at the center of the 20 MHz bandwidth, every 8 values in both directions from the center may have a tone allocated. The result may be tones at values −120 and +120. With 31 tone indexes in a 20 MHz bandwidth, a tone may be allocated every 0.645 MHz (e.g., 20 MHz/31 tone indexes=0.645 MHz per tone index). If the center of a 20 MHz channel is at 0 MHz, for example, every 0.645 MHz in each direction there may be an allocated tone.

Figure 3A:
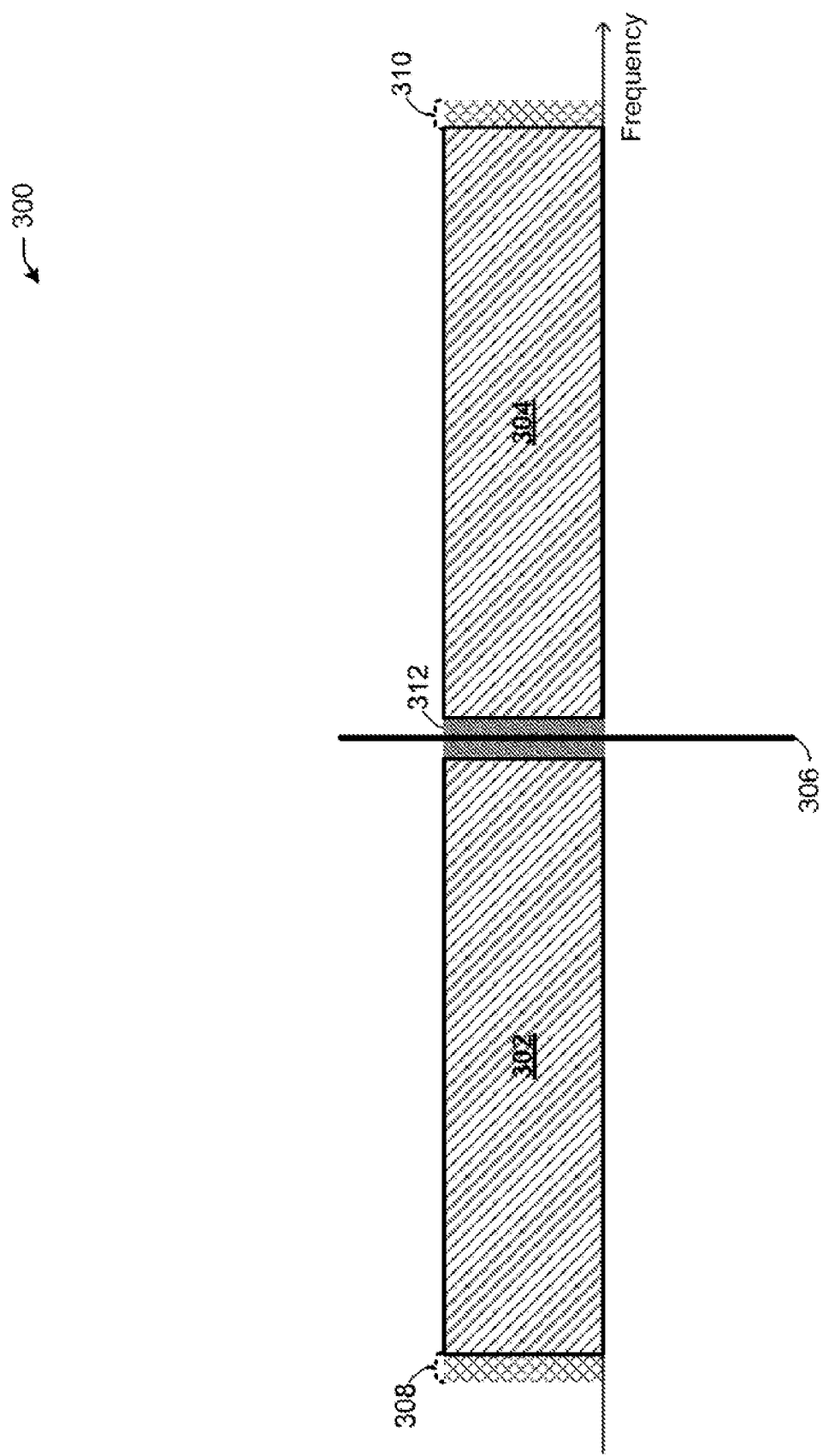
FIG. 3A depicts an illustrative schematic diagram of a 40 MHz bandwidth tone allocation.

FIG. 3A depicts an illustrative schematic diagram 300 of a 40 MHz bandwidth tone allocation.

Referring to FIG. 3A, a 40 MHz bandwidth may include a tone allocation of two 20 MHz sub-channels (e.g., sub-channel 302 and sub-channel 304). One or more DC subcarriers 306 may be set in the middle of the subcarriers. Guard interval 308 and guard interval 310 may be allocated at the edges of the 40 MHz bandwidth. Null tones 312 may be allocated at the center of the 40 MHz bandwidth around the one or more DC subcarriers 306.

In one embodiment, for a 40 MHz transmission, a frequency domain sequence for the HE TB PPDUs may be represented by the following equations: $HES_{-248:8:248}=\{M, -1, -M, 0, M-1, M\} (1+j/2)$, and $HES_{+248}=0$. $HES_{a:b:c}$ refers to coefficients of the HE-STF on every b tone indices from a to c tone indices, and coefficients on other tone indices are set to zero. The frequency domain sequence for the HE TB NDP feedback PPDU may be provided by: $HES^{TB\ NDP}_{-248:8:-8}=\{M, -1, -M\} (1+j/2)$ if the RU_TONE_SET_INDEX≤18, and $HES^{TB\ NDP}_{8:8:248}=\{M, -1, M\}(1+j/2)$ if the RU_TONE_SET_INDEX>18. M is a sequence for the HE-STF, and j is a unit imaginary number, and $_{-248:8:-8}$ and $_{8:8:248}$ refer to the index values for tones (e.g., tone indexes) beginning at −248 and continuing every 8 values until −8 (e.g., 31 tone indexes) and beginning at 8 and continuing every 8 values until 248 (e.g., 31 tone values). The gap in between −8 and +8 may be for STAs which do not operate in bandwidths larger than 20 MHz, as such devices may not be able to allocate tones beyond the 20 MHz bandwidth. The tone indexes may correspond to the location of where tones are allocated within the 40 MHz bandwidth. For example, starting at the center of a 20 MHz sub-channel, every 8 values in both directions from the center may have a tone allocated. A tone may be allocated every 0.645 MHz (e.g., 20 MHz/31 tone indexes=0.645 MHz per tone index) in a 20 MHz sub-channel. RU_TONE_SET_INDEX≤18 may refer to the sub-channel 302 in a 40 MHz (e.g., allocated to a first STA with a first AID), RU_TONE_SET_INDEX>18 may refer to the sub-channel 304 in a 40 MHz bandwidth (e.g., allocated to a second STA with a second AID).

Figure 3B:
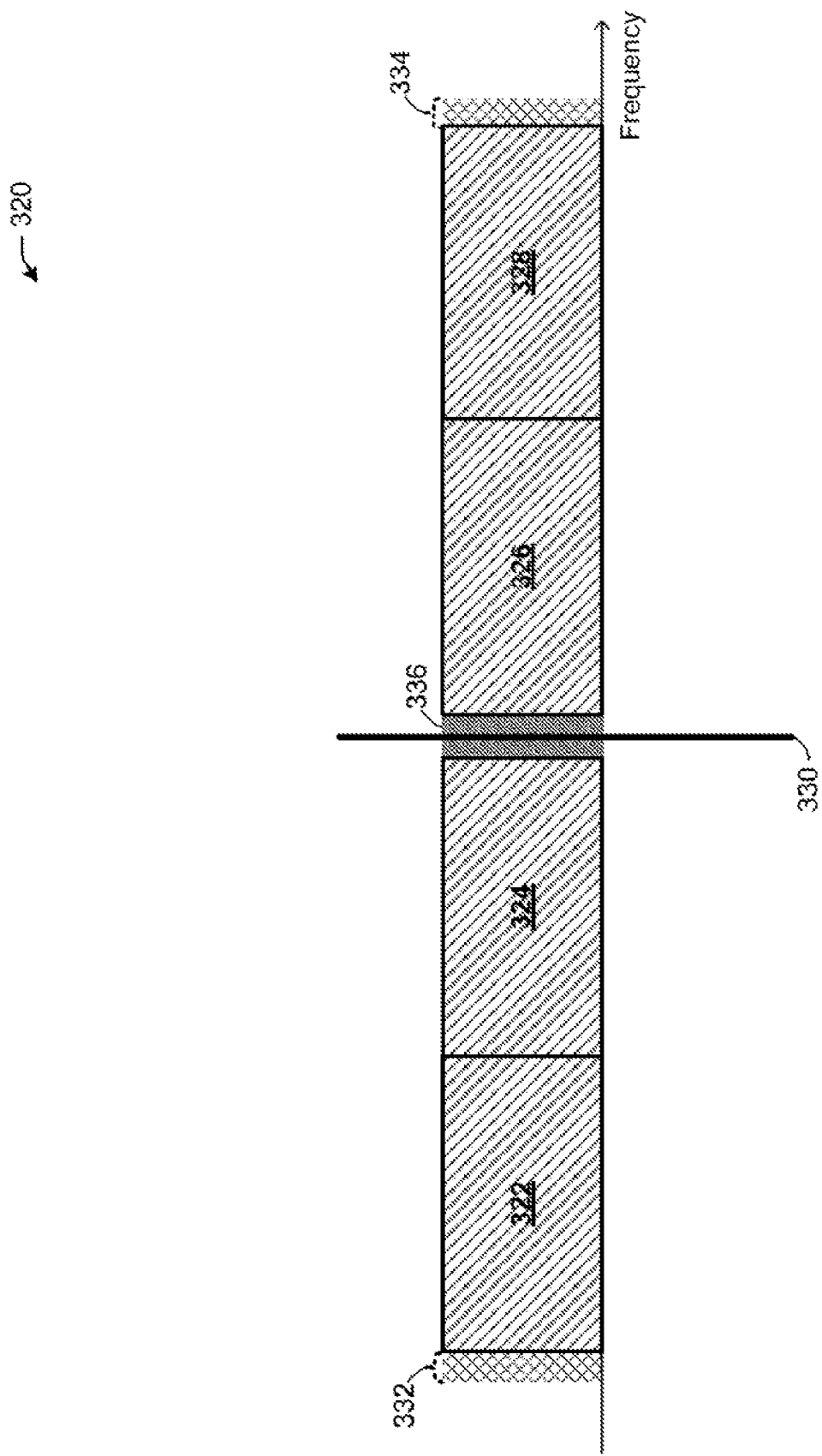
FIG. 3B depicts an illustrative schematic diagram of a 80 MHz bandwidth tone allocation.

FIG. 3B depicts an illustrative schematic diagram 320 of a 80 MHz bandwidth tone allocation.

Referring to FIG. 3B, a 80 MHz bandwidth may include a tone allocation of four 20 MHz sub-channels (e.g., sub-channel 322, sub-channel 324, sub-channel 326, and sub-channel 328). One or more DC subcarriers 330 may be set in the middle of the subcarriers. Guard interval 332 and guard interval 334 may be allocated at the edges of the 80 MHz bandwidth. Null tones 336 may be allocated at the center of the 80 MHz bandwidth around the one or more DC subcarriers 330.

In one embodiment, for a 80 MHz transmission, a frequency domain sequence for the HE TB PPDUs may be represented by the following equations: $HES_{-504:8:504} = \{M, -1, M-1, -M, -1, M, 0, -M, 1, M, 1, -M, 1, -M\} (1+j/2)$, and $HES_{+504} = 0$. $HES_{a:b:c}$ refers to coefficients of the HE-STF on every b tone indices from a to c tone indices, and coefficients on other tone indices are set to zero. The frequency domain sequence for the HE TB NDP feedback PPDU may be provided by: $HES^{TB\ NDP}_{-504:8:-264} = \{M, -1, M\} (1+j/2)$, if $RU\_TONE\_SET\_INDEX \leq 18$; $HES^{TB\ NDP}_{-248:8:-8} = \{-M, -1, M\} (1+j/2)$, if $18 < RU\_TONE\_SET\_INDEX \leq 36$; $HES^{TB\ NDP}_{8:8:248} = \{-M, 1, M\} (1+j/2)$, if $36 < RU\_TONE\_SET\_INDEX \leq 54$; and $HES^{TB\ NDP}_{264:8:504} = \{-M, 1, -M\} (1+j/2)$, if $RU\_TONE\_SET\_INDEX > 54$, where $HES^{TB\ NDP}_{+504} = 0$. M is a sequence for the HE-STF, and j is a unit imaginary number, and $_{-504:8:-264,\ -248:8:-8,\ 8:8:248,\ 264:8:504}$ refer to the index values for tones (e.g., tone indexes) beginning at −504 and continuing every 8 values until −264 (e.g., 31 tone indexes), beginning at −248 and continuing every 8 values until −8 (e.g., 31 tone values), beginning at 8 and continuing every 8 values until 248 (e.g., 31 tone indexes), and beginning at 264 and continuing every 8 values until 504 (e.g., 31 tone indexes). The gaps in between −264 and −248, between −8 and +8, between +248 and +264 may be for STAs which do not operate in bandwidths larger than 20 MHz, as such devices may not be able to allocate tones beyond the 20 MHz bandwidth. The tone indexes may correspond to the location of where tones are allocated within the 80 MHz bandwidth. The tone indexes may correspond to the location of where tones are allocated within the 80 MHz bandwidth. For example, starting at the center of a 20 MHz sub-channel, every 8 values in both directions from the center may have a tone allocated. A tone may be allocated every 0.645 MHz (e.g., 20 MHz/31 tone indexes=0.645 MHz per tone index) in a 20 MHz sub-channel.

For example, $RU\_TONE\_SET\_INDEX \leq 18$ may refer to the first 20 MHz sub-channel in a 80 MHz bandwidth (e.g., allocated to a first STA with a first AID), $18 < RU\_TONE\_SET\_INDEX \leq 36$ may refer to a second 20 MHz sub-channel in a 80 MHz bandwidth, $36 < RU\_TONE\_SET\_INDEX \leq 54$ may refer to a third 20 MHz sub-channel in a 80 MHz bandwidth, and $RU\_TONE\_SET\_INDEX > 54$ may refer to a fourth 20 MHz sub-channel in a 80 MHz bandwidth.

Figure 4:
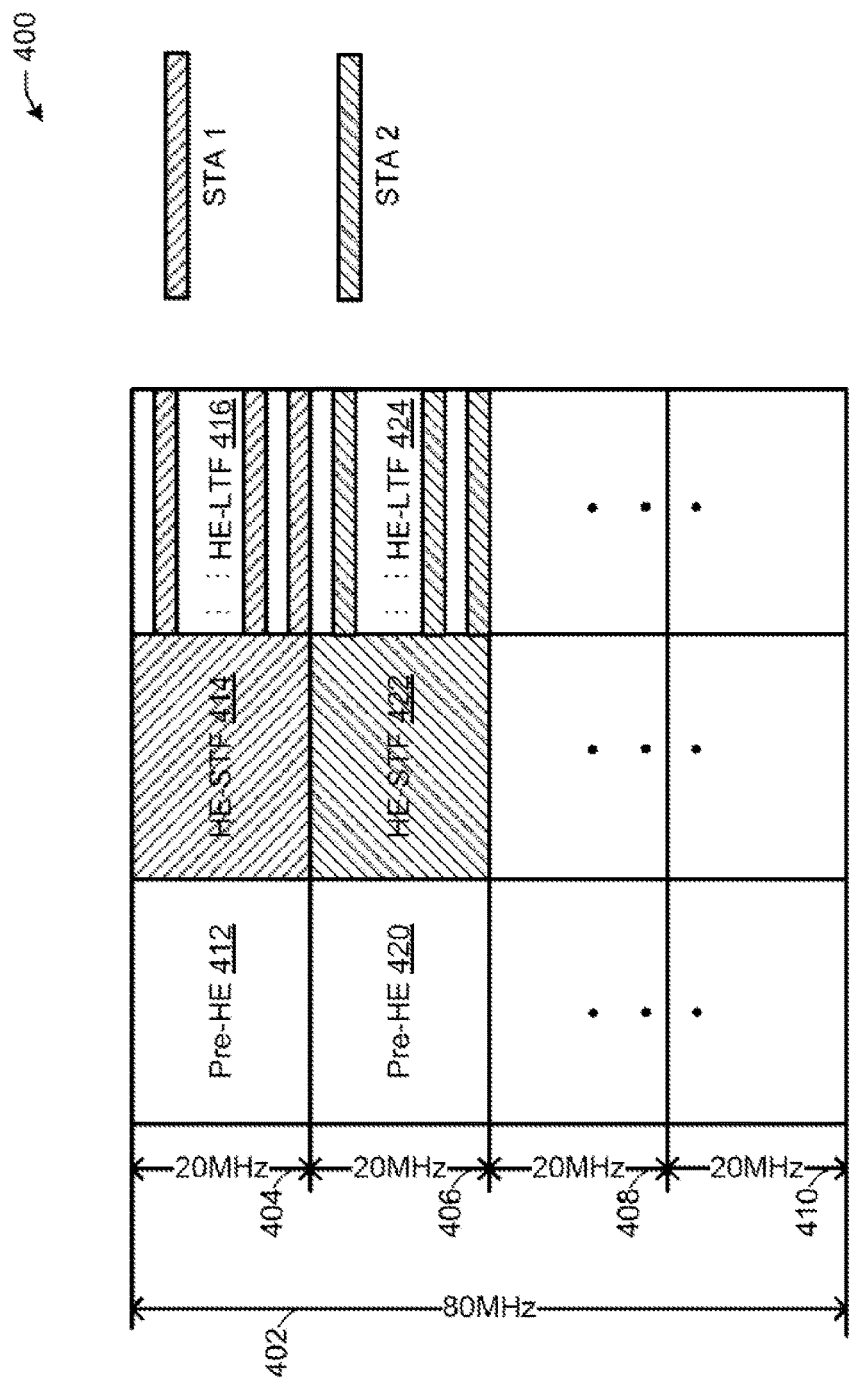
FIG. 4 depicts an illustrative schematic diagram for tone mapping of a trigger based null data packet (NDP) feedback physical layer protocol data unit (PPDU), in accordance with one or more example embodiments of the present disclosure.

FIG. 4 depicts an illustrative schematic diagram 400 for tone mapping of a trigger based NDP feedback PPDU, in accordance with one or more example embodiments of the present disclosure.

Referring to FIG. 4, there is shown a visualization of tone mapping of a trigger based NDP feedback PPDU. The schematic diagram 400 shows a 80 MHz bandwidth 402 with four 20 MHz sub-channels: sub-channel 404, sub-channel 406, sub-channel 408, sub-channel 410. In a bandwidth of 40 MHz, two sub-channels of 20 MHz would be used (not shown). Any 20 MHz sub-channel may be allocated to a STA (e.g., user devices 120 of FIG. 1), and a RU with a 20 MHz tone map may be used to allocate tones within the respective 20 MHz sub-channel. An AP (e.g., AP 102 of FIG. 1) may send a frame (e.g., a trigger frame) to indicate the 80 MHz bandwidth 402, the 20 MHz sub-channels, and the respective RUs and tone mapping schemes. As shown in FIG. 4, the sub-channel 404 may be allocated to a first STA (e.g., STA 1), and the sub-channel 406 may be allocated to a second STA (e.g., STA 2). The tones of a HE TB NDP feedback PPDU for the first STA may be allocated for the fields of the HE TB NDP feedback PPDUs sent by the respective STAs to which the sub-channels have been allocated. For example, the tones of the pre-HE modulated fields 412 (e.g., legacy STF, legacy long training field, legacy signal field, repeated legacy signal field, HE signal-A field), the HE-STF 414 tones, and the HE-LTF 416 tones may be allocated in a RU for the sub-channel 404. The tones of the pre-HE modulated fields 420, the HE-STF 422 tones, and the HE-LTF 424 tones may be allocated in a RU for the sub-channel 406.

In one embodiment, when a non-AP STA participates in an HE TB NDP short feedback operation, the STA may populate energy on six tones of the HE-LTF (e.g., the HE-LTF 416 and/or the HE-LTF 424 may have six tones). The six tones may be distributed across a 20 MHz sub-channel bandwidth In one embodiment, a trigger based NDP feedback system may define the following rules:

For 80 MHz operating non-AP devices, an HE-STF (e.g., HE-STF 414, HE-STF 422) may use an 80 MHz tone plan and 80 MHz sequences with the following exception: HE-STF tones may be populated on the tones that intersect with one physical 20 MHz sub-channel. The physical 20 MHz sub-channel may be identified based on the location that HE-LTF (e.g., HE-LTF 416, HE-LTF 424) tone set is allocated. For example, in FIG. 4, if the HE-LTF 416 tone set falls in the first 20 MHz sub-channel 404, the tones of the HE-STF 414 for STA 1 may be transmitted across the first 20 MHz sub-channel 404, and if STA 2 uses an HE-LTF 424 tone set that falls in the second 20 MHz sub-channel 406, the tones of the HE-STF 422 for STA 2 may be transmitted across the second 20 MHz sub-channel 406.

In one embodiment, UL multi-user (MU) transmissions may be preceded by a trigger frame or frame carrying a TRS Control subfield from the AP (e.g., AP 102 of FIG. 1). The trigger frame or frame carrying the TRS Control subfield may include parameters, such as a duration of a HE TB PPDU that a STA may use to respond to the trigger frame (e.g., a HE TB NDP feedback PPDU), RU allocation, target received signal strength indicator, and a modulation and coding scheme) required to transmit a HE TB PPDU. If a STA determines that there is no user information field in the trigger frame carrying the STA's AID, and there is no resource allocated to the STA for random access of a channel, then the STA may not transmit a HE TB PPDU. When a STA identifies its AID in a trigger frame indicating an HE TB PPDU for a UL response, the STA may send a HE TB NDP feedback PPDU using a tone mapping based on the RU_TONE_SET_INDEX determined by the STA based on the AIDs included in the trigger frame.

It is understood that the above descriptions are for purposes of illustration and are not meant to be limiting.

Figure 5:
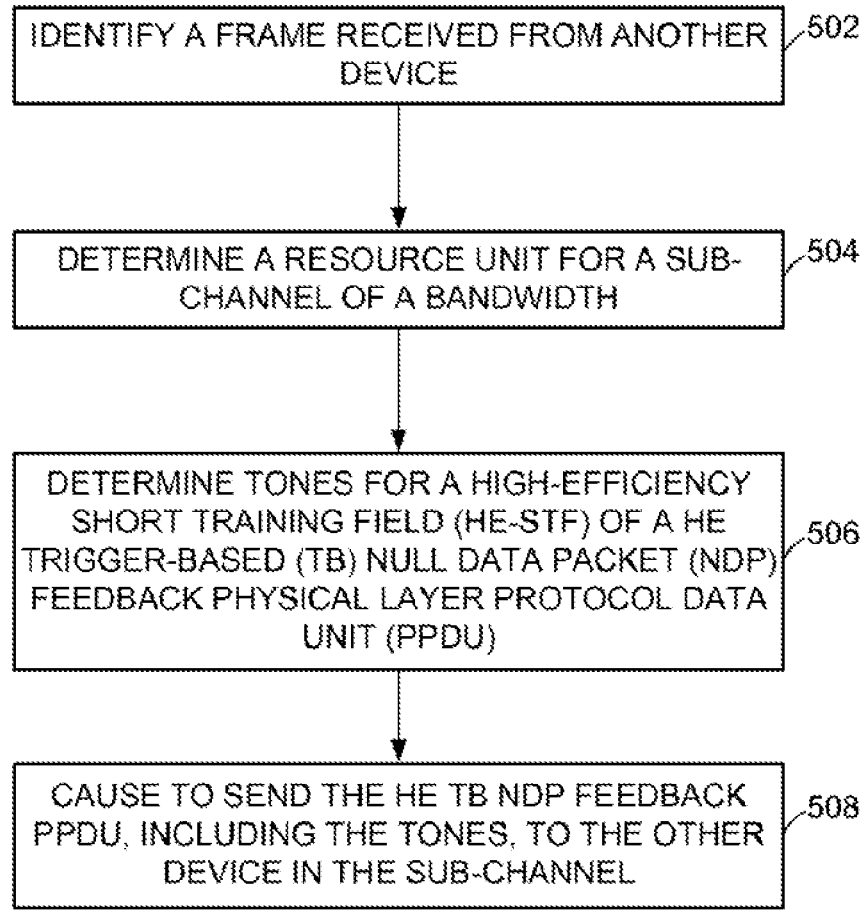
FIG. 5 illustrates a flow diagram of illustrative process for tone mapping of a trigger based NDP feedback PPDU, in accordance with one or more example embodiments of the present disclosure.

FIG. 5 illustrates a flow diagram of illustrative process 500 for an illustrative tone mapping of a trigger based NDP feedback PPDU, in accordance with one or more example embodiments of the present disclosure.

At block 502, a device (e.g., the user device(s) 120 of FIG. 1) may identify a frame (e.g., a trigger frame) received from a second device (e.g., the AP 102 of FIG. 1). The trigger frame may include AIDs identifying STAs, and the STAs whose AIDs may be included in the trigger frame may respond to the trigger frame by sending respective UL frames (e.g., a HE TB NDP feedback PPDU) based on information indicated by the trigger frame (e.g., the trigger frame may indicate that a HE TB NDP feedback PPDU should be sent by an STA identified by an AID included in the trigger frame). The AIDs included in a trigger frame may be used to determine an RU_TONE_SET_INDEX, which may indicate which 20 MHz sub-channel of a bandwidth to use in a bandwidth larger than 20 MHz.

At block 504, the device may determine, based on the frame, a RU for a 20 MHz sub-channel (e.g., sub-channel 404 of FIG. 4) of a bandwidth (e.g., 80 MHz bandwidth 402 of FIG. 4). The bandwidth may be 20 MHz, 40 MHz, 80 MHz, 160 MHz, 80+80 MHz, or another bandwidth large enough to allow a 20 MHz sub-channel RU. If the bandwidth is 20 MHz, a single 20 MHz sub-channel and associated RU may be used for a UL transmission in response to the frame received at block 502 (e.g., the trigger frame). If the bandwidth is larger than 20 MHz and allows multiple 20 MHz RUs, the device may determine the RU_TONE_SET_INDEX and the associated 20 MHz sub-channel to use for the UL transmission in response to the frame received in block 502. The RU may define a number of tones which may be allocated for the UL transmission.

At block 506, the device may determine, based on the resource unit and the bandwidth, tone indexes associated with a HE-STF of a HE TB NDP feedback PPDU. The tone indexes may indicate the locations within the RU where tones may be allocated. For a 20 MH transmission (e.g., when the bandwidth is 20 MHz), a frequency domain sequence for the HE TB PPDUs may be represented by the following equations: $HES_{-120:8:120} = \{M, 0, -M\}$ $(1+j/2)$. $HES_{a:b:c}$ refers to coefficients of the HE-STF on every b tone indices from a to c tone indices, and coefficients on other tone indices may be set to zero. The frequency domain sequence for the HE TB NDP feedback PPDU may be provided by: $HES^{TB\ NDP}_{-120:8:120} = HES_{-120:8:120}$. $HES^{TB\ NDP}_{-120:8:120}$ refers to the HE-STF for the HE TB NDP feedback PPDU. For a 40 MHz transmission, a frequency domain sequence for the HE TB PPDUs may be represented by the following equations: $HES_{-248:8:248} = \{M, -1, -M, 0, M-1, M\}$ $(1+j/2)$, and $HES_{+248} = 0$. $HES_{a:b:c}$ refers to coefficients of the HE-STF on every b tone indices from a to c tone indices, and coefficients on other tone indices are set to zero. The frequency domain sequence for the HE TB NDP feedback PPDU may be provided by: $HES^{TB\ NDP}_{-248:8:-8} = \{M, -1, -M\}$ $(1+j/2)$ if the RU_TONE_SET_INDEX≤18, and $HES^{TB\ NDP}_{8:8:248} = \{M, -1, M\}$ $(1+j/2)$ if the RU_TONE_SET_INDEX>18. For a 80 MHz transmission, a frequency domain sequence for the HE TB PPDUs may be represented by the following equations: $HES_{-504:8:504} = \{M, -1, M-1, -M, -1, M, 0, -M, 1, M, 1, -M, 1, -M\}$ $(1+j/2)$, and $HES_{\pm504} = 0$. $HES_{a:b:c}$ refers to coefficients of the HE-STF on every b tone indices from a to c tone indices, and coefficients on other tone indices are set to zero. The frequency domain sequence for the HE TB NDP feedback PPDU may be provided by: $HES^{TB\ NDP}_{-504:8:-264} = \{M, -1, M\}$ $(1+j/2)$, if RU_TONE_SET_INDEX≤18; $HES^{TB\ NDP}_{-248:8:-8} = \{-M, -1, M\}$ $(1+j/2)$, if 18<RU_TONE_SET_INDEX≤36; $HES^{TB\ NDP}_{8:8:248} = \{-M, 1, M\}$ $(1+j/2)$, if 36<RU_TONE_SET_INDEX≤54; and $HES^{TB\ NDP}_{264:8:504} = \{-M, 1, -M\}$ $(1+j/2)$, if RU_TONE_SET_INDEX>54, where $HES^{TB\ NDP}_{+504} = 0$. Using the tone index for the corresponding RU and bandwidth, the device may allocate tones for the HE TB NDP feedback PPDU, including the HE-STF of the HE TB NDP feedback PPDU. The tone values allocated to the locations associated with the tone indexes may be defined by the sequence M (or the negative of the sequence M, meaning −1 multiplied by the values of the sequence M), where M may be represented by the sequence: {−1, −1, −1, 1, 1, 1, −1, 1, 1, 1, −1, 1, 1, −1, 1}.

At block 508, the device may send the HE TB NDP feedback PPDU to the second device in the 20 MHz sub-channel. The device may use the tone indexes of the RU based on the bandwidth to send the tones of the HE TB NDP feedback PPDU using the RU that is allocated to the device. The tones for the HE-STF of the HE TB NDP feedback PPDU may be sent using the locations within the RU based on the tone indexes. The device receiving the HE TB NDP feedback PPDU (e.g., the AP 102 of FIG. 1) may expect the tones of the HE TB NDP feedback PPDU to be identified at the locations based on the tone indexes. For example, the HE-STF tones of the HE TB NDP feedback PPDU may be expected by the receiving device at locations according to the tone indexes. If the receiving device does not identify the expected tones at the expected locations, the receiving device may not properly identify and process the HE TB NDP feedback PPDU. For example, if a tone index for a different type of frame or different size RU were used in the UL response, the receiving device may not recognize the UL response as a HE TB NDP feedback PPDU.

It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), an enhanced tone mapping device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 702 for generation and processing of the baseband signals and for controlling operations of the main memory 704, the storage device 716, and/or the enhanced tone mapping device 719. The baseband processor may be provided on a single radio card, a single chip, or an integrated circuit (IC).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The enhanced tone mapping device 719 may carry out or perform any of the operations and processes (e.g., process 500 of FIG. 5) described and shown above.

In one embodiment, for a non-AP STA having 80 MHz operation capability, the HE-STF of the HE TB NDP feedback PPDU may use a tone map/grid and 80 MHz sequences. The HE-STF for an STA may be populated on the tones that intersect with one physical 20 MHz sub-channel in an 80 MHz bandwidth. The 20 MHz sub-channel may be used for the HE-LTF tone allocation. For example, in an 80 MHz bandwidth with four 20 MHz sub-channels, if an STA uses the first 20 MHz sub-channel for the HE-LTF tones, then the tones for the HE-STF also may be allocated in the first 20 MHz sub-channel. If an STA uses the second 20 MHz sub-channel for the HE-LTF tones, then the tones for the HE-STF also may be allocated in the second 20 MHz sub-channel.

For a 20 MHz transmission, the enhanced tone mapping device 719 may represent a frequency domain sequence for the HE TB PPDUs using the following equations: $HES_{-120:8:120}=\{M, 0, -M\} (1+j/2)$. $HES_{a:b:c}$ refers to coefficients of the HE-STF on every b tone indices from a to c tone indices, and coefficients on other tone indices may be set to zero. The frequency domain sequence for the HE TB NDP feedback PPDU may be provided by: $HES^{TB\ NDP}_{-120:8:120}=HES_{-120:8:120}$. The $HES^{TB\ NDP}_{-120:8:120}$ refers to the HE-STF for the HE TB NDP feedback PPDU. In the equation for the $HES_{-120:8:120}$, M is a sequence for the HE-STF, j is a unit imaginary number, and $_{-120:8:120}$ refers to the index values for tones (e.g., tone indexes) beginning at −120 and continuing every 8 values until 120 (e.g., 31 tone indexes). The tone indexes may correspond to the location of where tones are allocated within the 20 MHz bandwidth. For example, starting at the center of the 20 MHz bandwidth, every 8 values in both directions from the center may have a tone allocated. The result may be tones at values −120 and +120. With 31 tone indexes in a 20 MHz bandwidth, a tone may be allocated every 0.645 MHz (e.g., 20 MHz/31 tone indexes=0.645 MHz per tone index). If the center of a 20 MHz channel is at 0 MHz, for example, every 0.645 MHz in each direction there may be an allocated tone. The center of a channel or sub-channel does not have to be zero.

For a 40 MHz transmission, the enhanced tone mapping device 719 may represent a frequency domain sequence for the HE TB PPDUs using the following equations: $HES_{-248:8:248}=\{M, -1, -M, 0, M-1, M\} (1+j/2)$, and $HES_{\pm248}=0$. $HES_{a:b:c}$ refers to coefficients of the HE-STF on every b tone indices from a to c tone indices, and coefficients on other tone indices are set to zero. The frequency domain sequence for the HE TB NDP feedback PPDU may be provided by: $HES^{TB\ NDP}_{-248:8:-8}=\{M, -1, -M\} (1+j/2)$ if the RU_TONE_SET_INDEX≤18, and $HES^{TB\ NDP}_{8:8:248}=\{M, -1, M\} (1+j/2)$ if the RU_TONE_SET_INDEX>18. M is a sequence for the HE-STF, j is a unit imaginary number, and $_{-248:8:-8}$ and $_{8:8:248}$ refer to the index values for tones (e.g., tone indexes) beginning at −248 and continuing every 8 values until −8 (e.g., 31 tone indexes) and beginning at 8 and continuing every 8 values until 248 (e.g., 31 tone values). The gap in between −8 and +8 may be for STAs which do not operate in bandwidths larger than 20 MHz, as such devices may not be able to allocate tones beyond the 20 MHz bandwidth. The tone indexes may correspond to the location of where tones are allocated within the 40 MHz bandwidth. For example, starting at the center of a 20 MHz sub-channel, every 8 values in both directions from the center may have a tone allocated. A tone may be allocated every 0.645 MHz (e.g., 20 MHz/31 tone indexes=0.645 MHz per tone index) in a 20 MHz sub-channel.

In one embodiment, for a 80 MHz transmission, a frequency domain sequence for the HE TB PPDUs may be represented by the following equations: $HES_{-504:8:504}=\{M, -1, M-1, -M, -1, M, 0, -M, 1, M, 1, -M, 1, -M\} (1+j/2)$, and $HES_{\pm504}=0$. $HES_{a:b:c}$ refers to coefficients of the HE-STF on every b tone indices from a to c tone indices, and coefficients on other tone indices are set to zero. The frequency domain sequence for the HE TB NDP feedback PPDU may be provided by: $HES^{TB\ NDP}_{-504:8:-264}=\{M, -1, M\} (1+j/2)$, if RU_TONE_SET_INDEX≤18; $HES^{TB\ NDP}_{-248:8:-8}=\{-M, -1, M\} (1+j/2)$, if 18<RU_TONE_SET_INDEX≤36; $HES^{TB\ NDP}_{8:8:248}=\{-M, 1, M\} (1+j/2)$, if 36<RU_TONE_SET_INDEX≤54; and $HES^{TB\ NDP}_{264:8:504}=\{-M, 1, -M\} (1+j/2)$, if RU_TONE_SET_INDEX>54, where $HES^{TB\ NDP}_{\pm504}=0$. M is a sequence for the HE-STF, j is a unit imaginary number, and $_{-504:8:-264}$, $_{-248:8:-8}$, $_{8:8:248}$, and $_{264:8:504}$ refer to the index values for tones (e.g., tone indexes) beginning at −504 and continuing every 8 values until −264 (e.g., 31 tone indexes), beginning at −248 and continuing every 8 values until −8 (e.g., 31 tone values), beginning at 8 and continuing every 8 values until 248 (e.g., 31 tone indexes), and beginning at 264 and continuing every 8 values until 504 (e.g., 31 tone indexes). The gaps in between −264 and −248, between −8 and +8, between +248 and +264 may be for STAs which do not operate in bandwidths larger than 20 MHz, as such devices may not be able to allocate tones beyond the 20 MHz bandwidth. The tone indexes may correspond to the location of where tones are allocated within the 80 MHz bandwidth. The tone indexes may correspond to the location of where tones are allocated within the 80 MHz bandwidth. For example, starting at the center of a 20 MHz sub-channel, every 8 values in both directions from the center may have a tone allocated. A tone may be allocated every 0.645 MHz (e.g., 20 MHz/31 tone indexes=0.645 MHz per tone index) in a 20 MHz sub-channel.

The enhanced tone mapping device 719 may determine the RU_TONE_SET_INDEX, which may be provided by a trigger frame sent by an AP to one or more STAs. The trigger frame may have access identifiers (AIDs) identifying the STAs whose UL responses are intended to be triggered by the trigger frame. RU_TONE_SET_INDEX=(AID−Starting AID) mod ($18 \times 2^{BW}$), where BW refers to the bandwidth (e.g., 40 MHz, 80 MHz, 160 MHz), mod is a modulus, AID is the AID of a corresponding STA, and Starting AID is the first AID among multiple AIDs included in a sub-field of a User Information field of the trigger frame. RU_TONE_SET_INDEX≤18 may refer to the first 20 MHz sub-channel in a 40 MHz or 80 MHz bandwidth (e.g., allocated to a first STA with a first AID), RU_TONE_SET_INDEX>18 may refer to the second 20 MHz sub-channel in a 40 MHz bandwidth (e.g., allocated to a second STA with a second AID), 18<RU_TONE_SET_INDEX≤36 may refer to a second 20 MHz sub-channel in a 80 MHz bandwidth, 36<RU_TONE_SET_INDEX≤54 may refer to a third 20 MHz sub-channel in a 80 MHz bandwidth, and RU_TONE_SET_INDEX>54 may refer to a fourth 20 MHz sub-channel in a 80 MHz bandwidth.

The enhanced tone mapping device 719 may define the sequence M for different bandwidths. For the HE-STF, M may be $\{-1, -1, -1, 1, 1, 1, -1, 1, 1, 1, -1, 1, 1, -1, 1\}$ or another sequence of +1s and −1s. When M has 15 values, then for a 20 MHz tone allocation when $HES_{-120:8:120}=\{M, 0, -M\}$ $(1+j/2)$ and $HES^{TB\ NDP}_{-120:8:120}=HES_{-120:8:120}$, 31 tones may be allocated for the HE-STF of an HE TB feedback PPDU by the equation for a 20 MHz tone allocation. For a 40 MHz tone allocation when $HES^{TB\ NDP}_{-248:8:-8}=\{M, -1, -M\}$ $(1+j/2)$ if the RU_TONE_SET_INDEX≤18, and $HES^{TB\ NDP}_{8:8:248}=\{M, -1, M\}$ $(1+j/2)$ if the RU_TONE_SET_INDEX>18, each of the 20 MHz sub-channels of the 40 MHz bandwidth may have 31 tones allocated. For a 80 MHz tone allocation when $HES^{TB\ NDP}_{-504:8:-264}=\{M, -1, M\}$ $(1+j/2)$, if RU_TONE_SET_INDEX>18; $HES^{TB\ NDP}_{-248:8:-8}=\{-M, -1, M\}$ $(1+j/2)$, if 18<RU_TONE_SET_INDEX≤36; $HES^{TB\ NDP}_{8:8:248}=\{-M, 1, M\}$ $(1+j/2)$, if 36<RU_TONE_SET_INDEX≤54; and $HES^{TB\ NDP}_{264:8:504}=\{-M, 1, -M\}$ $(1+j/2)$, if RU_TONE_SET_INDEX>54, where $HES^{TB}_{NDP_{+504}}=0$, each of the 20 MHz sub-channels of the 80 MHz bandwidth may have 31 tones allocated. The HE-STF may be constructed by mapping the M sequence(s) multiplied by $(1+j)/\sqrt{2}$ or $(-1-j)/\sqrt{2}$ to any 242-tone RU in a 20 MHz sub-channel. For a transmission bandwidth greater than 40 MHz, $(1+j)/\sqrt{2}$ or $(-1-j)/\sqrt{2}$ may be assigned to tone indexes that are inside a center 26-tone RU of the transmission bandwidth.

The enhanced tone mapping device 719 may use the equations for allocating tones in different bandwidths as described above to relate the HE-STF tones to the location of the HE-LTF tones in a HE TB NDP feedback PPDU. In particular, the RU_TONE_SET_INDEX may be used to determine the tone indexes for the tones in the HE-LTF of the HE TB NDP feedback PPDU.

It is understood that the above are only a subset of what the enhanced tone mapping device 719 may be configured to perform and that other functions included throughout this disclosure may also be performed by the enhanced tone mapping device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as"exemplary" is not necessarily to be construed as preferred or advantageous over other embodiments. The terms"computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may be a device comprising memory and processing circuitry configured to: identify a frame received from a second device; determine, based on the frame, a resource unit allocated to the device, wherein the resource unit is associated with a 20 MHz sub-channel of a bandwidth; determine, based on the resource unit and the bandwidth, tones associated with a high-efficiency short training field (HE-STF) of a HE trigger-based (TB) null data packet (NDP) feedback physical layer protocol data unit (PPDU); and cause to send the HE TB NDP feedback PPDU to the second device in the 20 MHz sub-channel, wherein the HE TB NDP feedback PPDU comprises the tones.

Example 2 may include the device of example 1 and/or some other example herein, wherein the processing circuitry is further configured to determine, based on the frame, an access identifier associated with the first device, wherein to determine the tones is further based on the access identifier.

Example 3 may include the device of example 1 and/or some other example herein, wherein the bandwidth is 20 MHz, wherein the tones begin at a first tone index value of −120 and end at a second tone index value of 120, and wherein the tones of the HE-STF are defined by a sequence of numbers (M) from the first tone index value of −120 to a third tone index value of −8, a zero at a fourth tone index value of 0, and the negative sequence of numbers (−M) from a fifth tone index value of 8 to the second tone index value of 120.

Example 4 may include the device of example 1 and/or some other example herein, wherein the bandwidth is 40 MHz, wherein the tones begin at a first tone index value of −248 and end at a second tone index value of −8, and wherein the tones of the HE-STF are defined by a sequence of numbers (M) from the first tone index value of −248 to a third tone index value of −136, a negative one value at a fourth tone index value of −128, and the negative sequence of numbers (−M) from a fifth tone index value of −120 to the second tone index value of −8.

Example 5 may include the device of example 1 and/or some other example herein, wherein the bandwidth is 40 MHz, wherein the tones begin at a first tone index value of 8 and end at a second tone index value of 248, and wherein the tones are defined by a sequence of numbers (M) from the first tone index value of 8 to a third tone index value of 120, a negative one value at a fourth tone index value of 128, and the sequence of numbers (M) from a fifth tone index value of 136 to the second tone index value of 248.

Example 6 may include the device of example 1 and/or some other example herein, wherein the bandwidth is 80 MHz, wherein the tones begin at a first tone index value of −504 and end at a second tone index value of −264, and wherein the tones are defined by a sequence of numbers (M) from the first tone index value of −504 to a third tone index value of −392, a negative one value at a fourth tone index value of −384, the sequence of numbers (M) from a fifth tone index value of −376 to the second tone index value of −256.

Example 7 may include the device of example 1 and/or some other example herein, wherein the bandwidth is 80 MHz, wherein the tones begin at a first tone index value of −248 and end at a second tone index value of −8, and wherein the tones are defined by a negative sequence of numbers (−M) from the first tone index value of −248 to a third tone index value of −136, a negative one value at a fourth tone index value of −128, and the sequence of numbers (M) from a fifth tone index value of −120 to the second tone index value of −8.

Example 8 may include the device of example 1 and/or some other example herein, wherein the bandwidth is 80 MHz, wherein the tones begin at a first tone index value of 8 and end at a second tone index value of 248, and wherein the tones are defined by a negative sequence of numbers (−M) from the first tone index value of 8 to a third tone index value of 120, a positive one value at a fourth tone index value of 128, and the sequence of numbers (M) from a fifth tone index value of 128 to the second tone index value of 248.

Example 9 may include the device of example 1 and/or some other example herein, wherein the bandwidth is 80 MHz, wherein the tones begin at a first tone index value of 264 and end at a second tone index value of 504, and wherein the tones are defined by a negative sequence of numbers (−M) from the first tone index value of 264 to a third tone index value of 376, a positive one value at a fourth tone index value of 384, and the negative sequence of numbers (−M) from a fifth tone index value of 392 to the second tone index value of 504.

Example 10 may include the device of example 1 and/or some other example herein, wherein the tones associated with the HE-STF are defined by a sequence $\{-1, -1, -1, 1, 1, 1, -1, 1, 1, 1, -1, 1, 1, -1, 1\}$.

Example 11 may include the device of example 1 and/or some other example herein, further comprising a transceiver configured to transmit and receive wireless signals, wherein the wireless signals comprise the HE TB NDP feedback PPDU.

Example 12 may include the device of example 11 and/or some other example herein, further comprising one or more antennas coupled to the transceiver.

Example 13 may include a non-transitory computer-readable medium storing computer-executable instructions which when executed by one or more processors result in performing operations comprising: identifying, by a first device, a frame received from a second device; determining, based on the frame, a resource unit allocated to the first device, wherein the resource unit is associated with a 20 MHz sub-channel of a bandwidth; determining, based on the resource unit and the bandwidth, tones associated with a high-efficiency short training field (HE-STF) of a HE trigger-based (TB) null data packet (NDP) feedback physical layer protocol data unit (PPDU); and causing to send the HE TB NDP feedback PPDU to the second device in the 20 MHz sub-channel, wherein the HE TB NDP feedback PPDU comprises the tones.

Example 14 may include the non-transitory computer-readable medium of example 13 and/or some other example herein, the operations further comprising determining, based on the frame, an access identifier associated with the first device, wherein to determine the tones is further based on the access identifier.

Example 15 may include the non-transitory computer-readable medium of example 13 and/or some other example herein, wherein the bandwidth is 20 MHz, wherein the tones begin at a first tone index value of −120 and end at a second tone index value of 120, and wherein the tones of the HE-STF are defined by a sequence of numbers (M) from the first tone index value of −120 to a third tone index value of −8, a zero at a fourth tone index value of 0, and the negative sequence of numbers (−M) from a fifth tone index value of 8 to the second tone index value of 120.

Example 16 may include the non-transitory computer-readable medium of example 13 and/or some other example herein, wherein the bandwidth is 40 MHz, wherein the tones begin at a first tone index value of −248 and end at a second tone index value of −8, and wherein the tones are defined by $\{M, -1, -M\}(1+j)/\sqrt{2}$, wherein M is a sequence $\{-1, -1, -1, 1, 1, 1, -1, 1, 1, 1, -1, 1, 1, -1, 1\}$, and wherein j is an imaginary number.

Example 17 may include the non-transitory computer-readable medium of example 13 and/or some other example herein, wherein the bandwidth is 40 MHz, wherein the tones begin at a first tone index value of 8 and end at a second tone index value of 248, and wherein the tones are defined by $\{M, -1, M\}(1+j)/\sqrt{2}$, wherein M is a sequence $\{-1, -1, -1, 1, 1, 1, -1, 1, 1, 1, -1, 1, 1, -1, 1\}$, and wherein j is an imaginary number.

Example 18 may include the non-transitory computer-readable medium of example 9 and/or some other example herein, wherein the bandwidth is 80 MHz, wherein the tones begin at a first tone index value of −504 and end at a second tone index value of −264, and wherein the tones are defined by $\{M, -1, M\}(1+j)/\sqrt{2}$, wherein M is a sequence $\{-1, -1, -1, 1, 1, 1, -1, 1, 1, 1, -1, 1, 1, -1, 1\}$, and wherein j is an imaginary number.

Example 19 may include the non-transitory computer-readable medium of example 9 and/or some other example herein, wherein the bandwidth is 80 MHz, and wherein: the tones begin at a first tone index value of −248 and end at a second tone index value of −8, the tones begin at a third tone index value of 8 and end at a fourth tone index value of 248, or the tones begin at a fifth tone index value of 364 and end at a sixth tone index value of 504, and the tones are defined by $\{-M, 1, -M\}(1+j)/\sqrt{2}$, M is a sequence $\{-1, -1, -1, 1, 1, 1, -1, 1, 1, 1, -1, 1, 1, -1, 1\}$, and j is an imaginary number.

Example 20 may include a method comprising: identifying, by processing circuitry of a first device, a frame received from a second device; determining, based on the frame, a resource unit allocated to the first device, wherein the resource unit is associated with a 20 MHz sub-channel of a bandwidth; determining, based on the resource unit and the bandwidth, tones associated with a high-efficiency short training field (HE-STF) of a HE trigger-based (TB) null data packet (NDP) feedback physical layer protocol data unit (PPDU); and causing to send the HE TB NDP feedback PPDU to the second device in the 20 MHz sub-channel, wherein the HE TB NDP feedback PPDU comprises the tones.

Example 21 may include an apparatus comprising means for: identifying a frame received from a second apparatus; determining, based on the frame, a resource unit allocated to the first device, wherein the resource unit is associated with a 20 MHz sub-channel of a bandwidth; determining, based on the resource unit and the bandwidth, tones associated with a high-efficiency short training field (HE-STF) of a HE trigger-based (TB) null data packet (NDP) feedback physical layer protocol data unit (PPDU); and causing to send the HE TB NDP feedback PPDU to the second apparatus in the 20 MHz sub-channel, wherein the HE TB NDP feedback PPDU comprises the tones.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for sending high-efficiency (HE) feedback data packets, the device comprising processing circuitry coupled to storage, the processing circuitry configured to:
   identify a trigger frame received from a second device;
   identify, based on the trigger frame, a resource unit allocated to the device, wherein the resource unit is associated with a 20 MHz portion of a bandwidth;
   utilize, based on the resource unit and the bandwidth, tones associated with a high-efficiency short training field (HE-STF) of a HE trigger-based (TB) feedback null data packet (NDP), wherein a first tone of the tones having a smallest tone index value is set to zero, and wherein a second tone of the tones having a largest tone index value is set to zero; and
   send the HE TB feedback NDP to the second device in the 20 MHz portion of the bandwidth, wherein the HE TB feedback NDP comprises the tones.

2. The device of claim 1, wherein the processing circuitry is further configured to identify, based on the trigger frame, an access identifier associated with the device, wherein to utilize the tones is further based on the access identifier.

3. The device of claim 1, wherein the bandwidth is 40 MHz, wherein the tones begin at the smallest tone index value of −248 and end at a first tone index value of −8, and wherein the tones of the HE-STF are defined by a sequence of numbers (M) from the smallest tone index value of −248 to a second tone index value of −136, a negative one value at a third tone index value of −128, and the negative sequence of numbers (−M) from a fourth tone index value of −120 to the first tone index value of −8.

4. The device of claim 1, wherein the bandwidth is 40 MHz, wherein the tones begin at a first tone index value of 8 and end at a second tone index value of 248, and wherein the tones are defined by a sequence of numbers (M) from the first tone index value of 8 to a third tone index value of 120, a negative one value at a fourth tone index value of 128, and the sequence of numbers (M) from a fifth tone index value of 136 to the largest tone index value of 248.

5. The device of claim 1, wherein the bandwidth is 80 MHz, wherein the tones begin at the smallest tone index value of −504 and end at a first tone index value of −264, and wherein the tones are defined by a sequence of numbers (M) from the smallest tone index value of −504 to a second tone index value of −392, a negative one value at a third tone index value of −384, the sequence of numbers (M) from a fourth tone index value of −376 to the first tone index value of −264.

6. The device of claim 1, wherein the bandwidth is 80 MHz, wherein the tones begin at a first tone index value of −248 and end at a second tone index value of −8, and wherein the tones are defined by a negative sequence of numbers (−M) from the first tone index value of −248 to a third tone index value of −136, a negative one value at a fourth tone index value of −128, and the sequence of numbers (M) from a fifth tone index value of −120 to the second tone index value of −8.

7. The device of claim 1, wherein the bandwidth is 80 MHz, wherein the tones begin at a first tone index value of 8 and end at a second tone index value of 248, and wherein the tones are defined by a negative sequence of numbers (−M) from the first tone index value of 8 to a third tone index value of 120, a positive one value at a fourth tone index value of 128, and the sequence of numbers (M) from a fifth tone index value of 128 to the second tone index value of 248.

8. The device of claim 1, wherein the bandwidth is 80 MHz, wherein the tones begin at a first tone index value of 264 and end at a second tone index value of 504, and wherein the tones are defined by a negative sequence of numbers (−M) from the first tone index value of 264 to a third tone index value of 376, a positive one value at a fourth tone index value of 384, and the negative sequence of numbers (−M) from a fifth tone index value of 392 to the largest tone index value of 504.

9. The device of claim 1, wherein the tones associated with the HE-STF are defined by a sequence $\{-1, -1, -1, 1, 1, 1, -1, 1, 1, 1, -1, 1, 1, -1, 1\}$.

10. The device of claim 1, further comprising a transceiver configured to transmit and receive wireless signals, wherein the wireless signals comprise the HE TB feedback NDP.

11. The device of claim 10, further comprising an antenna coupled to the transceiver.

12. A non-transitory computer-readable medium storing computer-executable instructions which when executed by one or more processors of a first device result in performing operations comprising:
    identifying a trigger frame received from a second device;
    identifying, based on the trigger frame, a resource unit allocated to the first device, wherein the resource unit is associated with a 20 MHz portion of a bandwidth;
    utilizing, based on the resource unit and the bandwidth, tones associated with a high-efficiency short training field (HE-STF) of a HE trigger-based (TB) feedback null data packet (NDP), wherein a first tone of the tones having a smallest tone index value is set to zero, and wherein a second tone of the tones having a largest tone index value is set to zero; and
    sending the HE TB feedback NDP to the second device in the 20 MHz portion of the bandwidth, wherein the HE TB feedback NDP comprises the tones.

13. The non-transitory computer-readable medium of claim 12, the operations further comprising identifying, based on the trigger frame, an access identifier associated with the first device, wherein utilizing the tones is further based on the access identifier.

14. The non-transitory computer-readable medium of claim 12, wherein the bandwidth is 40 MHz, wherein the tones begin at the smallest tone index value of −248 and end at a first tone index value of −8, and wherein the tones are defined by $\{M, -1, -M\}(1+j)/\sqrt{2}$, wherein M is a sequence $\{-1, -1, -1, 1, 1, 1, -1, 1, 1, 1, -1, 1, 1, -1, 1\}$, and wherein j is an imaginary number.

15. The non-transitory computer-readable medium of claim 12, wherein the bandwidth is 40 MHz, wherein the tones begin at a first tone index value of 8 and end at the largest tone index value of 248, and wherein the tones are defined by {M, −1, M}(1+j)/√2, wherein M is a sequence {−1, −1, −1, 1, 1, 1, −1, 1, 1, 1, −1, 1, 1, −1, 1}, and wherein j is an imaginary number.

16. The non-transitory computer-readable medium of claim 12, wherein the bandwidth is 80 MHz, wherein the tones begin at the smallest tone index value of −504 and end at a first tone index value of −264, and wherein the tones are defined by {M, −1, M}(1+j)/√2, wherein M is a sequence {−1, −1, −1, 1, 1, 1, −1, 1, 1, 1, −1, 1, 1, −1, 1}, and wherein j is an imaginary number.

17. The non-transitory computer-readable medium of claim 13, wherein the bandwidth is 80 MHz, and wherein:
the tones begin at a first tone index value of −248 and end at a second tone index value of −8,
the tones begin at a third tone index value of 8 and end at a fourth tone index value of 248, or
the tones begin at a fifth tone index value of 364 and end at the largest tone index value of 504, and
the tones are defined by {-M, 1, −M}(1+j)/√2, M is a sequence {−1, −1, −1, 1, 1, 1, −1, 1, 1, 1, −1, 1, 1, −1, 1}, and j is an imaginary number.

18. A method for sending high-efficiency (HE) feedback data packets, the method comprising:
identifying, by one or more processors of a first device, a trigger frame received from a second device;
identifying, based on the trigger frame, a resource unit allocated to the first device, wherein the resource unit is associated with a 20 MHz portion of a bandwidth;
utilizing, based on the resource unit and the bandwidth, tones associated with a high-efficiency short training field (HE-STF) of a HE trigger-based (TB) feedback null data packet (NDP), wherein a first tone of the tones having a smallest tone index value is set to zero, and wherein a second tone of the tones having a largest tone index value is set to zero; and
sending the HE TB feedback NDP to the second device in the 20 MHz portion of the bandwidth, wherein the HE TB feedback NDP comprises the tones.

19. The method of claim 18, wherein the bandwidth is 40 MHz, wherein the tones begin at the smallest tone index value of −248 and end at a first tone index value of −8, and wherein the tones are defined by {M, −1, −M}(1+j)/√2, wherein M is a sequence {−1, −1, −1, 1, 1, 1, −1, 1, 1, 1, −1, 1, 1, −1, 1}, and wherein j is an imaginary number.

20. The method of claim 18, wherein the bandwidth is 40 MHz, wherein the tones begin at a first tone index value of 8 and end at the largest tone index value of 248, and wherein the tones are defined by {M, −1, M}(1+j)/√2, wherein M is a sequence {−1, −1, −1, 1, 1, 1, −1, 1, 1, 1, −1, 1, 1, −1, 1}, and wherein j is an imaginary number.

* * * * *